Aug. 7, 1934.  F. W. SIDE  1,969,158
CONTROL INSTRUMENT
Filed March 17, 1933   5 Sheets-Sheet 1
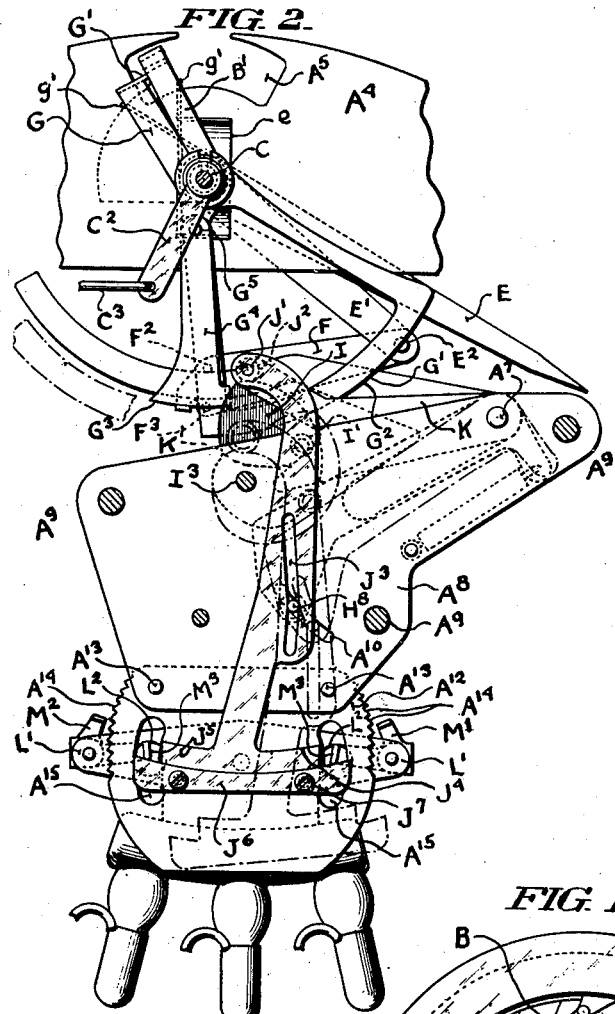
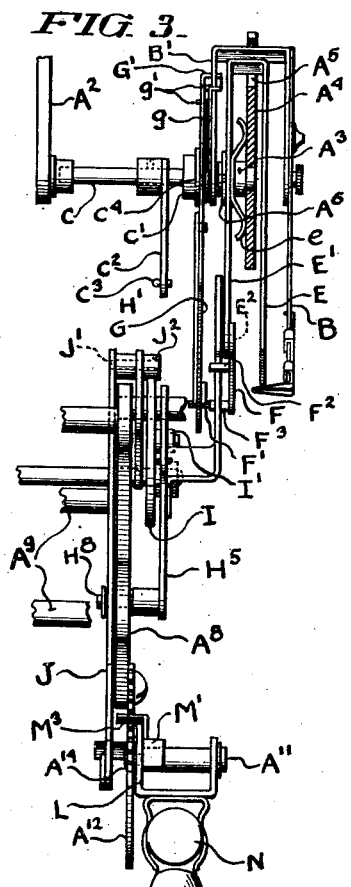
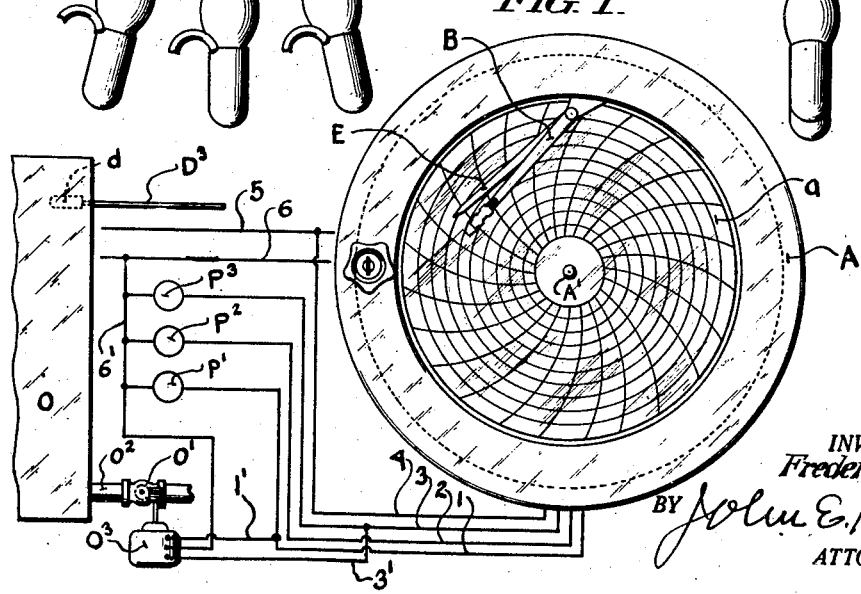
INVENTOR.
Frederick W. Side,
BY John E. Hubbell
ATTORNEY Aug. 7, 1934.　　　　　F. W. SIDE　　　　　1,969,158
CONTROL INSTRUMENT
Filed March 17, 1933　　　5 Sheets-Sheet 2

INVENTOR.
Frederich W. Side,
BY John E. Hubbell
ATTORNEY

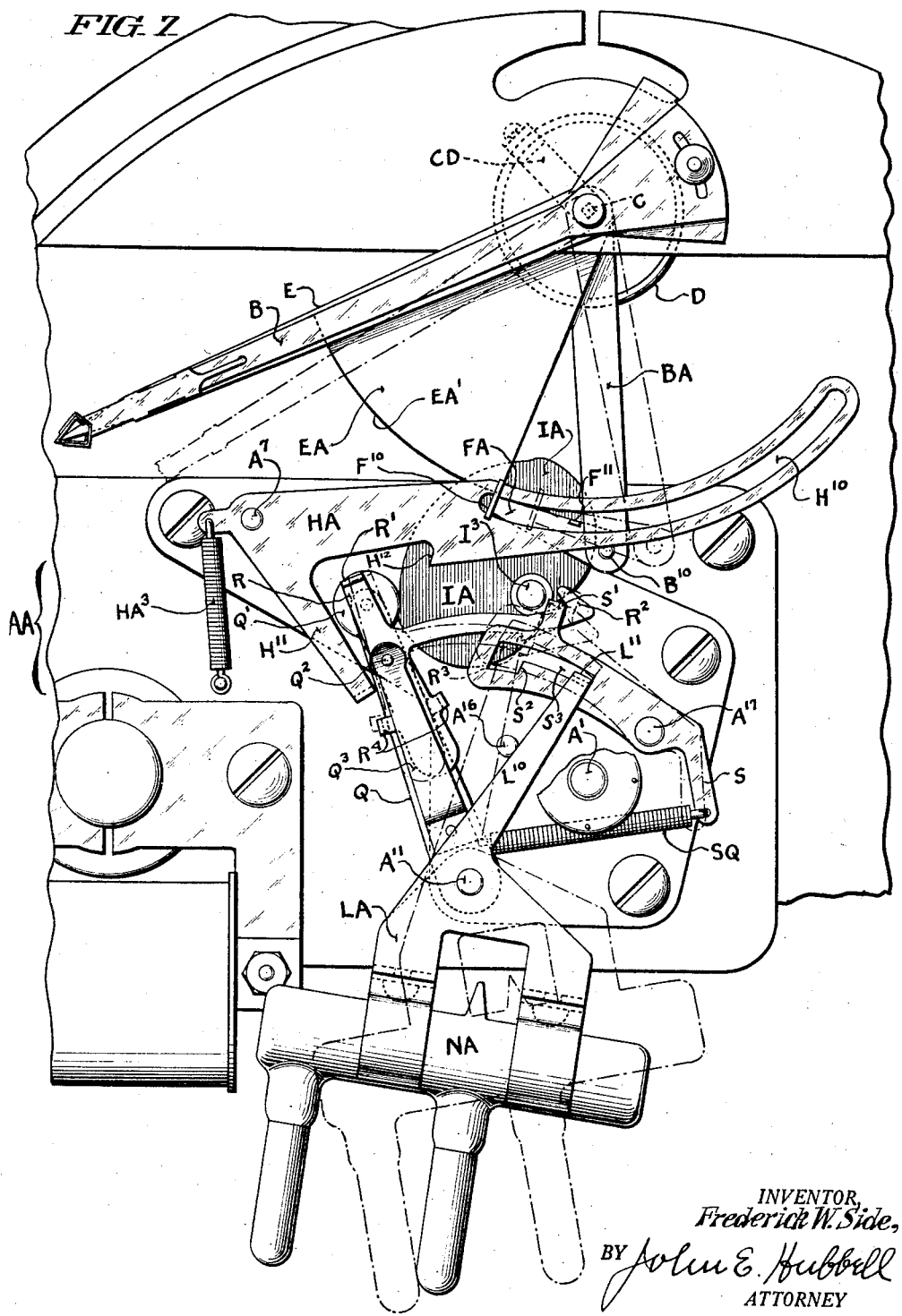

Aug. 7, 1934.  F. W. SIDE  1,969,158
CONTROL INSTRUMENT
Filed March 17, 1933  5 Sheets-Sheet 4
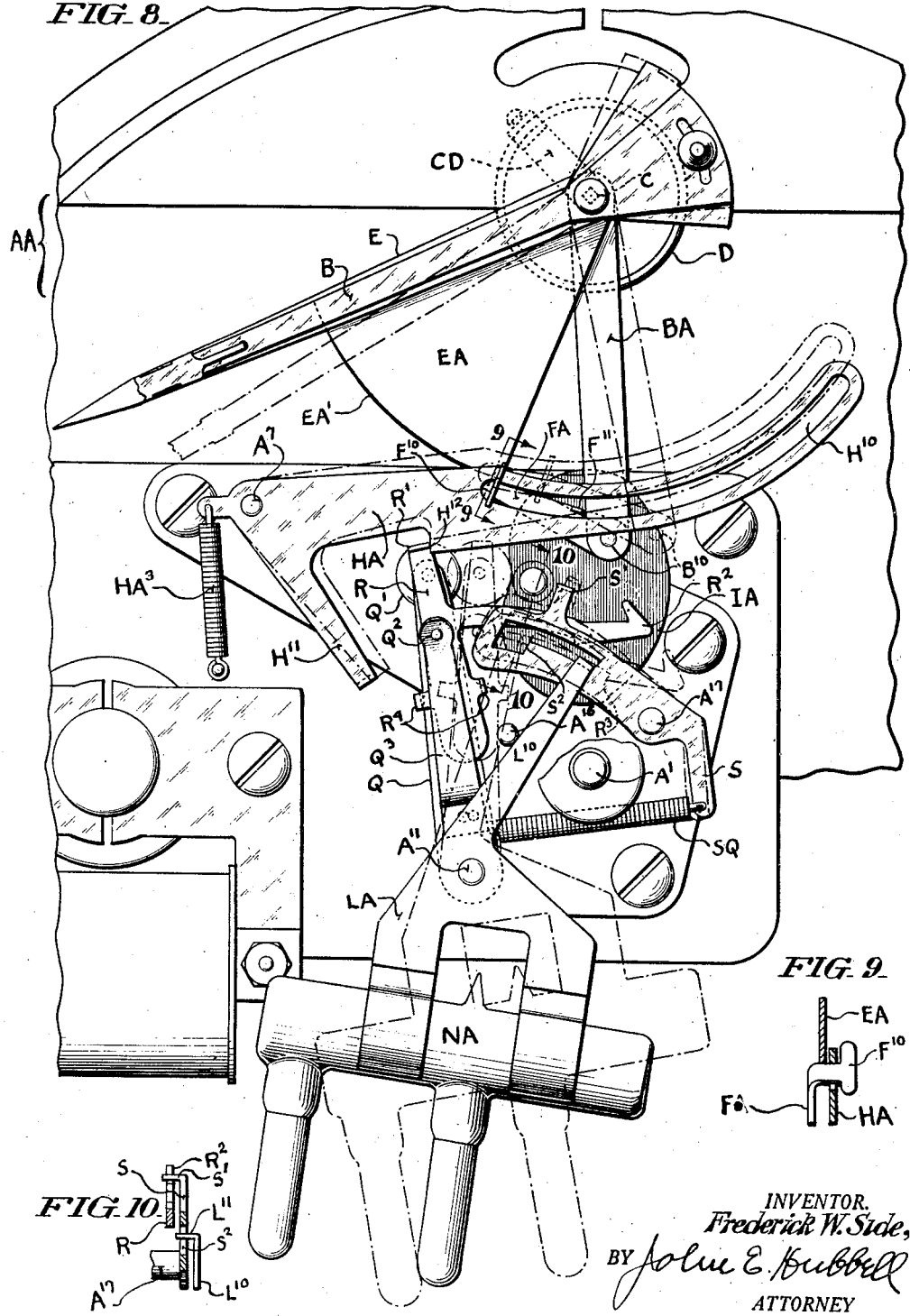

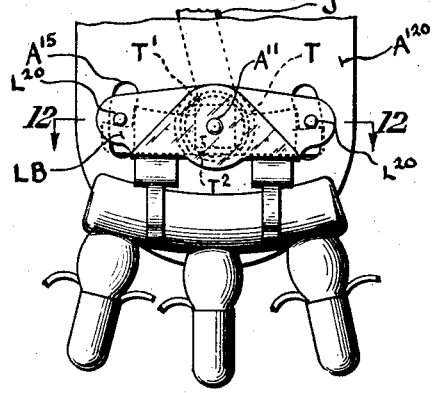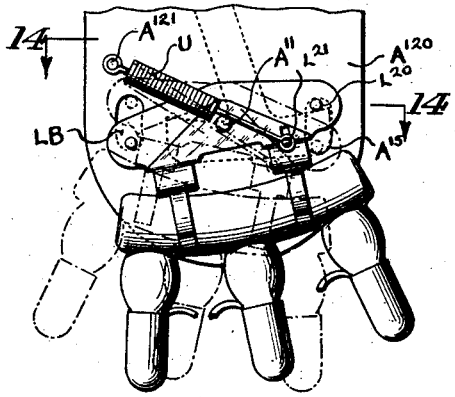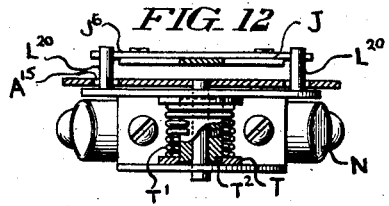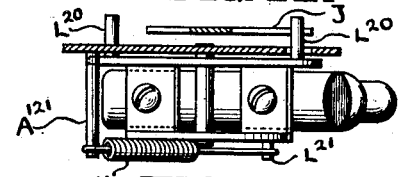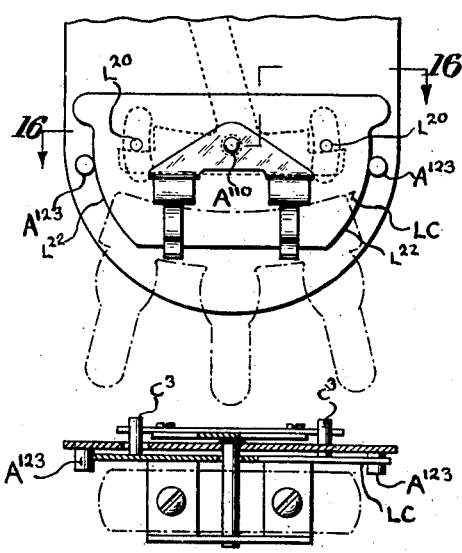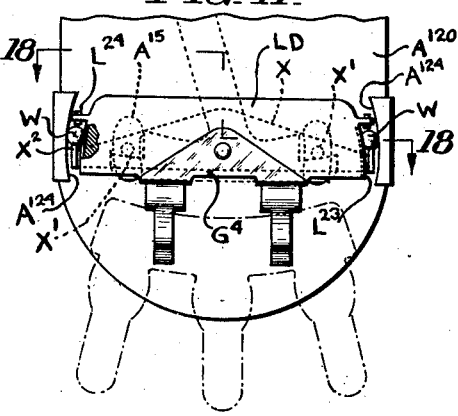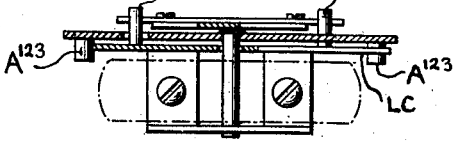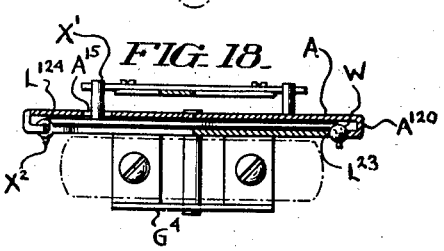

Patented Aug. 7, 1934

1,969,158

UNITED STATES PATENT OFFICE 1,969,158

CONTROL INSTRUMENT

Frederick W. Side, Philadelphia, Pa., assignor to The Brown Instrument Company, Philadelphia, Pa., a corporation of Pennsylvania Application March 17, 1933, Serial No. 661,293

27 Claims. (Cl. 200—56)

The general object of the present invention is to provide improved apparatus for producing control effects selectively dependent upon the changes in a control condition, such as the change in value of a temperature, pressure or other quantity, measured by measuring means included in or associated with the control apparatus. A more specific general object of the present invention is to provide a control instrument for the above mentioned purposes which is characterized by special features of construction and arrangement giving the instrument desirable simplicity and reliability and contributing to a compactness not found in instruments previously employed for the same general purposes.

The most usual form of control instrument now in use for the general purposes for which my present invention was primarily devised and is especially adapted, is sometimes aptly designated as an instrument of the pinch-the-needle type. Such an instrument comprises a deflecting element including a flexible pointer, and also comprises means periodically engaging the pointer and bending it transversely to its deflection plane to thereby produce control effects dependent upon the pointer deflection at the time. The flexible pointer may be a simple indicating pointer deflecting along a scale but more usually is a pointer carrying a marking device by which the changes in value of the control condition are recorded upon a chart disc or strip. The usual pinch-the-needle type of control instrument comprises a so-called depressor which is periodically oscillated about an axis parallel to the pointer deflection plane to move a pointer engaging portion of the depressor transversely of said plane into engagement with the pointer and thereby bend the latter away from said plane and into operative engagement with a cooperating part or parts, such as flexible or pivoted switch contacts or switch actuating members through which the control effects are produced.

My improved control instrument differs from the usual pinch-the-needle type of the control instrument of the prior art, in that it produces periodic control effects selectively dependent upon the varying deflective position of a deflecting element including an indicating pointer, pen arm or analogous exhibiting member, without bending or directly engaging the latter, and in that the relative movements of the parts through which variations in the deflective position of the deflecting element produce different or selective control effects are not transverse, but are parallel to the plane of deflection of said element, and in that the reaction on the deflecting element resulting from the engagement of said parts is substantially radial to the axis of deflection of the deflecting element, and does not tend to change the deflective position of said element.

In the preferred embodiments of my present invention, the deflecting element and cooperating mechanism include two members one of which does, while the other does not, share the deflective movements of the deflecting element, and one of which is periodically moved parallel to the plane of deflection of said element toward and away from the axis of deflection, along a path the extent of which is dependent upon and varies with the deflective position of the deflecting element.

While the present invention is adapted for use in effecting two position control, i. e., one control effect when the value of the controlling condition is relatively high and a different control effect when said value is relatively low, a desirable characteristic of the invention is its ready capacity for use in effecting three position control, in which in addition to the two control effects last mentioned, a third control effect is produced when the control condition is at or suitably close to an intermediate normal value.

In preferred practical embodiments of the invention in a three position control instrument one of the two above mentioned members is formed with one engaging shoulder or surface extending circularly about the axis of deflection of the deflecting element and with a second engaging shoulder or surface also extending circularly about the said axis but at a different distance therefrom and angularly displaced from the first mentioned shoulder. In consequence, the relative movement of said two members in a direction radial to the axis of deflection is variably limited accordingly as one or the other of the two shoulders is in position for engagement by the cooperating member. In general it is immaterial which of the two above mentioned members shares the deflective movements of the deflecting element, and immaterial which of those two members is given periodic movements toward the axis of the deflecting element. In general, however, the member which does not share the deflective movements of the deflecting element should be adjustable angularly about the axis of deflection to permit of adjustment in the normal value of the controlling quantity or condition.

The mechanism through which the two above mentioned members produce the desired control effects may be of various forms. Advantageously, however, that mechanism includes a mercury control switch for tilting said switch into two or three different operating positions, accordingly as two or three position control is desired, and more specific objects of the invention are to provide novel and effective means for giving such a switch its required movements.

The various features of novelty which characterize the present invention are set forth in the claims annexed to and forming a part of this specification. For a better understanding of the invention, however, its advantages and specific objects obtained with it, reference should be had to the accompanying drawings and descriptive matter in which I have illustrated and described preferred embodiments of the invention.

Of the drawings:

Fig. 1 is a diagram of a control system including a preferred form of control instrument;

Fig. 2 is a rear elevation, with parts broken away and in section, of a portion of the control instrument shown in Fig. 1;

Fig. 3 is a view taken at right angles to Fig. 2;

Fig. 7 is a front elevation, generally similar to Fig. 4, illustrating a modified form of control instrument;

Fig. 8 is a view differing from Fig. 7 in that parts are shown in different relative positions;

Fig. 9 is a section on the line 9—9 of Fig. 8;

Fig. 10 is a section on the line 10—10 of Fig. 8;

Fig. 11 is a partial elevation illustrating a modification of the control switch mechanism shown in Figs. 1–4;

Fig. 12 is a plan view, partly in section on the line 12—12 of Fig. 10, of parts shown in Fig. 10;

Fig. 13 is a view taken similarly to Fig. 11 and illustrating another control switch modification;

Fig. 14 is a section on the line 14—14 of Fig. 13;

Fig. 15 is a view taken similarly to Fig. 11, illustrating a third control switch modification;

Fig. 16 is a section on the line 16—16 of Fig. 15;

Fig. 17 is a view taken similarly to Fig. 11 illustrating a fourth control switch modification; and Fig. 18 is a section on the line 18—18 of Fig. 17.

Figure 4:
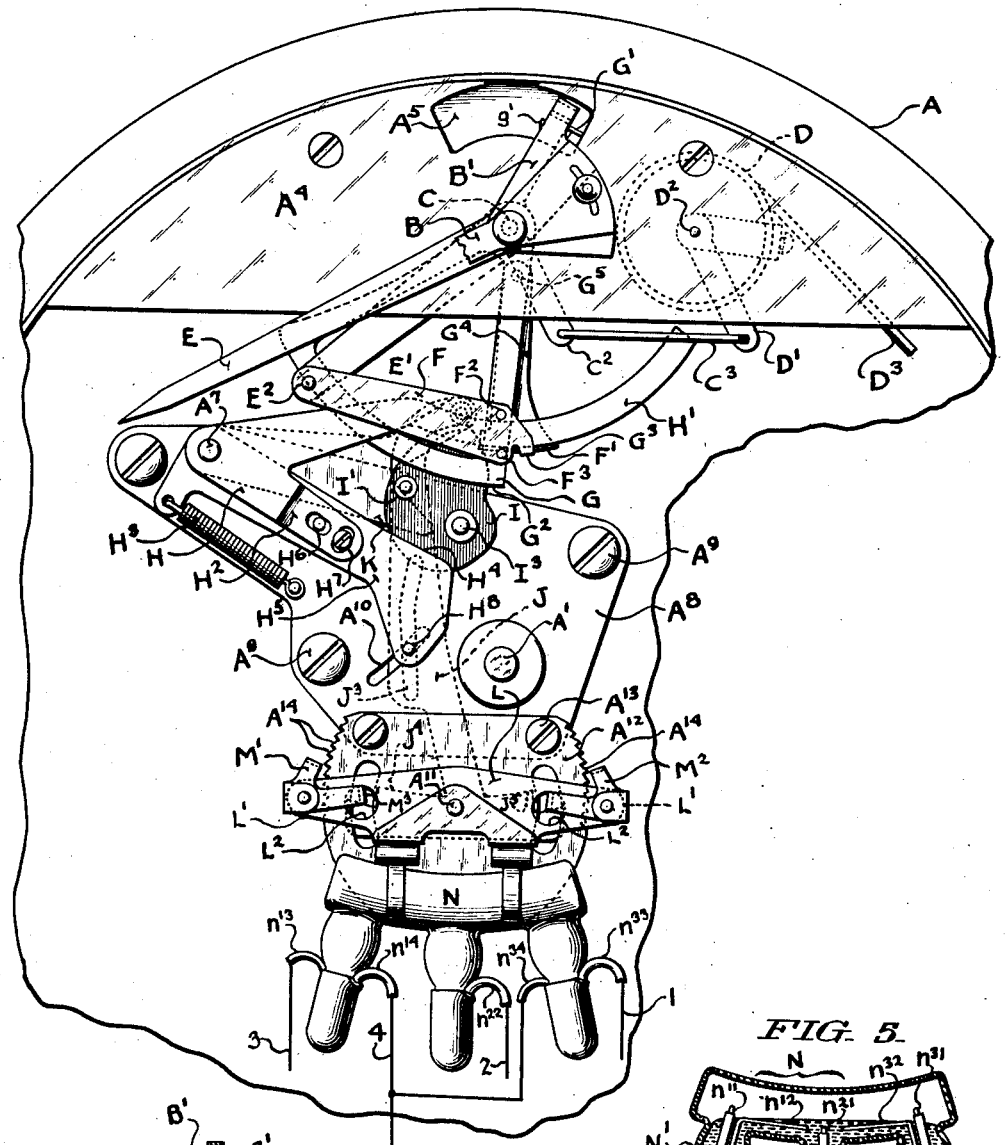
Fig. 4 is a front elevation of the parts shown in Figs. 2 and 3.
Figure 6:
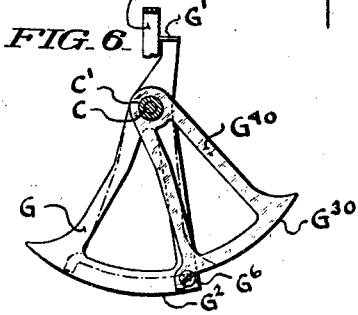
Fig. 6 is a front elevation, partly in section, illustrating a modification of a portion of the apparatus shown in Figs. 1–4.

In the drawings and referring first to the embodiment of the invention illustrated in Figs. 1 to 4, A represents a recording meter and control instrument including a chart disc $a$ rotated in the usual manner by a chart driving shaft A', and on which a record is traced by a recording pen carried by a pen arm B. As shown, the pen arm B is oscillated by a rock shaft C journalled at one end in a stationary part $A^2$ forming a part of the instrument framework, and journalled at its other end in a stud or part $A^3$ secured to a plate-like member $A^4$ which also forms a portion of the instrument framework. As shown, the pen arm B is adjustably connected to one leg of a U shaped member B', the yoke portion of which passes through a notch $A^5$ in the plate $A^4$ and the other leg of which is secured to a hub like part C' secured to a shaft C. The latter is oscillated through an arm $C^2$ secured to the shaft and connected by a link $C^3$ to an actuating arm D' oscillating about the pivot or shaft $D^2$. For the particular use illustrated, the arm D' is given its oscillating movements by a Bourdon tube D of helical form having one end $D^3$ stationary and the other connected to the arm D'. The latter oscillates therefore in accordance with the changes in the fluid pressure transmitted to the tube D from an expansion fluid thermometer bulb, a steam chamber or pipe, or other source of fluid pressure variations to be measured by the deflection of the pen arm B.

The control provisions associated with the above mentioned measuring features, comprise means fixing the normal value of the controlling pressure in the tube D and including an index arm E in front of the record disc. The latter forms a part of a U shaped member, the yoke portion of which extends through the notch $A^5$ in the plate $A^4$ and connects the arm E to a parallel arm E' journalled on the stud $A^3$. The angular position of the arm E indicates on the chart scale the normal value of the quantity measured, and through parts associated with the arm E' the instrument produces control effects dependent upon the relation to said normal value of the actual value of said quantity. The arms E and E' are angularly adjustable about the axis of the shaft C to thereby vary the said normal value, but are normally held stationary by a spring $e$ acting between the plate $A^4$ and the arm E' and pressing the latter against a collar portion $A^6$ of the stationary stud member $A^3$. The collar $A^6$ and spring $e$ thus form yielding means tending to frictionally hold the arms E and E' stationary in any angular position into which they may be adjusted.

The control parts associated with the arm E' include a member F having one end pivotally connected at $E^2$ to the lower end of the arm E'. Adjacent its free end the arm F carries a transverse projection F' through which at periodic control intervals the angular adjustment of the arm F about the pivot $E^2$ is made dependent on the correspondingly relative angular positions of the pen arm B and normal index E. Adjacent its free end the arm F carries two other lateral projections $F^2$ and $F^3$ through which the adjustment of the arm F at each of said intervals controls the position at the time of the hereinafter mentioned member H and thereby determines the character of the control effect then produced.

The means coacting with the projection F' to determine the angular position of the member F at each of said periodic control intervals includes a member G pivotally mounted on the hub part C' carried by the shaft C and normally oscillating with the latter and the pen arm B, but the operating connection between the member G and shaft C is preferably adapted to yield under certain conditions as hereinafter explained. As shown, said connection includes a spring $g$ having a body portion coiled about the hub part C' and end portions terminating in transverse extending projections $g'$, one of which engages the arm B' while the other engages the member G, so that the spring $g$ tends to continuously hold an offset upper end portion G' of the member G against the adjacent edge of the arm B'. Advantageously, also, the spring $g$ acts between the arm B' and the member G to hold the latter in frictional engagement with a collar $C^4$ carried by the hub part C' at the rear end of the latter.

At its lower end the member G is provided with a shoulder or edge $G^2$ extending circularly about the shaft C. The shoulder $G^2$ is engaged by the projection F' and thereby determines the angular adjustment of the member F at each periodic control interval at which the value of the quantity measured is relatively low. When that value is at or sufficiently near its normal value, the member G is displaced clockwise (as seen in Fig. 4) too far to permit engagement of the shoulder $G^2$ by the projection F', and the latter may then engage a second shoulder $G^3$ of the member G. The shoulder $G^3$ also extends circularly about the shaft C, but is closer to the latter than is the shoulder $G^2$. On a clockwise adjustment of the member G corresponding to a value of the quantity measured sufficiently above the normal value, the shoulder $G^3$ is displaced to the left (as shown in Fig. 4) so that it is no longer in position to be engaged by the projection F', and the latter is then permitted to approach more closely to the shaft C than when the shoulder $G^3$ is in position to arrest the upswing of the projection F".

In a control apparatus of this type it is ordinarily or at least frequently desirable to avoid control effects correcting for low and high values of the quantity measured not only at the precise normal value of the quantity indicated by the position of the arms E and E', but also through a certain range of variation in the actual value, the extent of which varies with conditions. To permit a variation in that range, provisions are made for varying the effective length or circular extent of the shoulder $G^3$. To this end in the construction shown in Figs. 1–4, the shoulder $G^3$ is formed on a part $G^4$ pivotally connected at $G^5$ to the part of the member G carrying the shoulder $G^2$, and the part $G^4$ is frictionally held or otherwise adjustably secured to the said part in any desired relative adjustment of said parts.

Between each two successive control intervals the member F is oscillated about its pivotal support $E^2$ away from and back toward the shaft C, the movement away from the shaft being great enough to separate the projection F" from the shaft C by a distance greater than that between the shoulder $G^2$ and the shaft. The member F is given its oscillating movements by the member H, through which the member F also effects control positions dependent upon the position assumed by the member F at the end of its movements toward the shaft C.

The member H is shown as comprising a bell crank lever including arms H' and $H^2$, and journalled on a pivot $A^7$ carried by the instrument framework. The free end portion of the arm H' is in the form of an arc extending circularly about the shaft C and passing between the previously mentioned projections $F^2$ and $F^3$, carried by the arm F. Preferably and as shown, the projections $F^2$ and $F^3$ are in the form of round pins so spaced apart to avoid binding engagement with the concave and convex edges of the portion of the arm H' between them, while at the same time avoiding undue lost motion, notwithstanding the necessary variations in the relative positions of the pivot pins $E^2$ and $A^7$. As shown, the pivot pin $A^7$ is carried by a plate $A^8$ connected to other portions of the instrument framework by supporting studs or bolts $A^9$. The lever member H is given its movements in the clockwise direction, as seen in Fig. 4, whereby the projection F" is moved toward the shaft C, by a spring $H^3$, and is given its movements in the opposite direction by a cam roller I' mounted on a pivot pin $I^2$ carried by a cam member I secured on a constantly rotating cam shaft $I^3$. Advantageously the shoulder $H^4$ of the member H engaged by the cam roller I' is formed on a part $H^5$ of the member H which is angularly adjustable about the pivot $A^7$ relative to the arms H' and $H^2$ of the member H. As shown the adjustment of the part $H^5$ is effected by an eccentric $H^6$ mounted in the part $A^5$ and working in a corresponding slot in the arm $H^2$, and a clamping screw $H^7$ tapped into the part $H^5$ and passing through a slot in the arm $H^2$ secures the latter and part $H^5$ together in any desired adjustment.

A selector element J is periodically actuated by the cam I to effect control switch adjustments selectively dependent upon the different angular positions assumed by the member H under the action of the spring $H^3$ and hence upon the different angular positions of the shaft C and member F relative to the member G. As shown, the selector member J comprises a bar like part, the upper end of which carries a transverse pivot J' on which is journalled a roller $J^2$. The latter rides upon the edge of, and is supported by the cam member I. The rising and falling movement of the upper end of the member J produced by the rotation of the cam I is guided by a radius or distance bar K pivotally connected to the upper end of the member J by the pivot J' and pivotally connected to the frame plate $A^8$ by the pivot $A^7$. To positively insure the down movement of the member J, when the position of the cam I permits, the member K is provided with a shoulder K' engaged by a suitable portion of the cam I which, as shown, is formed by the rear portion of the stud I' on which the cam roller $I^2$ is journalled. With the construction shown, each down movement of the member J carries its lower end into the position shown in dotted lines in Fig. 2. As the upper end of the member J is raised to its uppermost position, the lower end of the member J is moved upward along one or another of the three paths in accordance with the position then occupied by the member H, through means shown as comprising a pin $H^8$ carried by the part $H^5$ and entering a suitably shaped slot $J^3$ in the member J. As the latter is back, and the part $H^4$ is in front of the plate $A^8$, the latter is formed with a slot $A^{10}$ through which the pin $H^8$ extends. As shown, the engagement of the pin $H^8$ with the upper end of the slot $A^{10}$ serves to limit the up movement of the members H and F under the action of spring $H^3$ when the projection F" is deflected to the low side of the shoulder $G^3$.

The position of the normal value indicator E may be manually adjusted in any direction at any time. If the adjustment is to establish a higher normal value, i. e., in the clockwise direction, as shown in Fig. 4, and happens to be made at a time in which the projection F" is nearer the axis of the shaft C than is the shoulder $G^3$ of the engaging part $G^4$ or the shoulder $G^2$ of the engaging part G, so that the projection F" engages a radial portion of the member G proper or the part $G^2$ thereof, the spring $g$ yields to permit the necessary movement of the part G' away from the arm B'. On the following down movement of the lever H produced by the cam I, the part G' moves back into engagement with the arm B' restoring the normal condition of the apparatus.

With the embodiment of the invention illustrated in Figs. 1 to 4, the device directly controlled by the movements of the member J is a mercury switch N mounted in a supporting frame L suspended on a pivot pin $A^{11}$ carried by the instrument framework. As shown, the pivot pin $A^{11}$ is a stud carried by a plate or disc $A^{12}$ which is secured by screws or bolts $A^{13}$ to the plate $A^8$. The frame L comprises oppositely extending arms L' to the ends of which are pivotally connected pawl members M' and M², each of which, as shown, has a gravital tendency to move into a position in which it engages the teeth $A^{14}$ of an adjacent ratchet wheel-like portion of the member $A^{12}$ coaxial with the pivot $A^{11}$. Each of the pawl members M' and M² has an inwardly extending arm terminating in a transversely extending portion M³ which passes through a corresponding hole $L^2$ in the member L, and through a corresponding slot $A^{15}$ in the member $A^{12}$, into a position for operative engagement with the member J which is at the rear side of the member $A^{12}$, whereas the arms L' are in front of the member.

When the pressure in the Bourdon tube D or other value measured is relatively low and the angular position of the member G is such that the angular position of the member H is then fixed by the engagement of the projection F' with the shoulder $G^2$, so that the pin $H^8$ is in the low portion of the slot $A^{10}$, the uprising movement of the member J causes a shoulder $J^4$ thereof to engage the projection M³ of the pawl member M'. As the up movement of the member J continues, the pawl member M' is turned out of locking engagement with the adjacent ratchet teeth $A^{14}$ and its projection M³ is moved into engagement with the upper side of the corresponding hole $L^2$ in the arm L', and as the movement of the member J continues, the switch frame L is turned clockwise (as seen in Fig. 4) about the pivot $A^{11}$. As this movement of the frame occurs, the pawl M² rides over the adjacent teeth $A^{14}$ and does not oppose the movement. As soon as the member J completes its up movement and starts downward again, the pawl M² engages the adjacent teeth $A^{11}$ and the switch frame is then locked by the pawls M' and M² against movement in either direction.

On a change in the deflective position of the shaft C and member G such that the projection F' is to the right of the shoulder $G^3$, when the parts are seen as shown in Fig. 4, so that the member H can turn under the action of the spring $H^3$ until the pin $H^8$ engages the upper end of the slot $A^{10}$, the path of up movement of the lower end of the member J will cause the shoulder $J^5$ of the latter to engage the projection M³ of the pawl M². This will tilt the pawl M² out of engagement with the adjacent ratchet teeth $A^{14}$ and cause the projection M³ of the pawl M² to engage the upper wall of the corresponding opening $L^2$ and tilt the switch frame L to the full limit of its movement in the counterclockwise direction.

Whenever the deflection of the shaft C and member G into their neutral or normal value positions occur, so that the projection F' may engage the shoulder $G^3$, the corresponding path of up movement of the lower end of the member J will cause the two shoulders $J^4$ and $J^5$ of the latter to pass between the projections M³ of the pawls M' and M², and at the end of the corresponding up movement of the member J, the parts assume the position shown in full lines in Fig. 2. In this condition of the apparatus the projections M³ of both pawls M' and M² are engaged by other portions of member J, such other portions being formed, as shown, by the ends of a bar $J^6$ adjustably secured to the lower end of the member J by screws $J^7$. The upper edges of the end portions of the bar $J^6$ are located at levels sufficiently below the levels of the shoulders $J^4$ and $J^5$ so that as the member J moves into the position shown in full lines in Fig. 2, the projection M³ of each pawl is engaged between the bar $J^6$ and the top wall of the corresponding aperture $L^2$ in the switch frame member L and the latter is thereby adjusted into its intermediate or neutral position, if not previously occupying that position.

Figure 5:
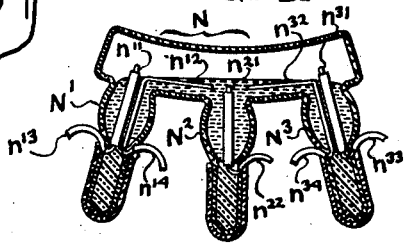
Fig. 5 is an elevation in section of a mercury control switch shown in Figs. 2, 3 and 4.

As shown, the switch frame L includes a clip or bracket L' in which the control switch N is held. In the particular form of the switch N illustrated, shown best in Fig. 5, the switch is a mercury switch and comprises a container body portion which is in the form of a curved tube having its concave side uppermost and which is in open communication with pocket extensions N', $N^2$ and $N^3$ of the container body at the under side of the latter. In the pocket extension N' there are mounted two contacts $n^{11}$ and $n^{12}$. The contact $n^{11}$ is connected to an external terminal $n^{13}$ and is insulated from the mercury within the container except at its upper end. The contact $n^{12}$ is connected with an external terminal $n^{14}$ and may be in contact with the mercury at all points along its length. The contact $n^{12}$ includes an upper transverse portion extending along the bottom of the space within the body portion of the container into proximity with the pocket $N^2$ so that in the neutral position of the switch, the contact $n^{12}$ will be connected by the mercury to the single contact $n^{21}$ mounted in the pocket $N^2$. When the switch N is turned counterclockwise, as seen in Figs. 4 and 5, from its neutral position the excess of mercury in the switch over that required to then fill the three pocket extensions shifts clockwise relative to the switch container and then connects the contacts $n^{11}$ and $n^{12}$. In the neutral position of the switch, as well as when the latter is shifted clockwise, as seen in Figs. 4 and 5, from its neutral position, the exposed end of the contact $n^{11}$ is above the mercury and the latter does not connect the contacts $n^{11}$ and $n^{12}$.

The contact $n^{21}$ in the central pocket is connected below the mercury level in the latter to an external terminal $n^{22}$, and is not insulated from, or out of contact with the mercury in any operative position of the switch. Associated with the pocket $N^3$ are contacts and terminals $n^{31}$, $n^{32}$, $n^{33}$ and $n^{34}$ similar in arrangement and operation to the contacts and terminals $n^{11}$, $n^{12}$, $n^{13}$ and $n^{14}$, respectively, except that the elongated transversely extending upper portions of the contacts $n^{12}$ and $n^{32}$ face in opposite directions and extend in similar proximity to the central pocket $N^2$ so that in the neutral position of the switch the central contact $n^{21}$ is connected to the contact $n^{32}$ as well as to the contact $n^{12}$. When the switch is tilted to either side of its neutral position, the mercury does not connect the contact $n^{21}$ with either of the contacts $n^{12}$ and $n^{32}$.

The switch N of the instrument A may be used in various ways and for various purposes. By way of example I have illustrated diagrammatically in Fig. 1 one control system form in which the control instrument with its switch N may be used. In Fig. 1, O represents a heater in which the temperature attained varies the pressure in a fluid expansion thermometer bulb d connected to the stationary end $D^3$ of the Bourdon tube D of the instrument A. As the temperature in the heater O varies and the Bourdon tube D correspondingly adjusts the shaft C of the instrument A, the latter correctively increases or diminishes the heat supplied to the heater O by adjustment of a control valve O' in a supply pipe O² leading to the heater. When the latter is a furnace the pipe O² may supply liquid or gaseous fuel, and when the device O is heated by steam or hot water the pipe O² supplies steam or hot water, to the heater at a rate depending upon the adjustment of the valve O'. The valve O' is adjusted by a reversible motor O³ which is automatically controlled by the instrument A and the latter also causes one or another of three signal lamps P', P² and P³ to glow accordingly as the heater temperature at $d$ is low, high or normal, respectively.

The circuit connection shown for the control of the motor N³ and the signal lamps P', P², P³ by the instrument A include conductors 1, 2, 3 and 4. Within the instrument A, the conductor 1 is connected to the terminal $n^{33}$ and thereby to the switch contact $n^{31}$; the conductor 2 is connected to the switch terminal $n^{22}$ and thereby to the contact $n^{21}$; the conductor 3 is connected to the terminal $n^{13}$ and thereby to the switch contact $n^{11}$, and the conductor 4 is connected to each of the terminals $n^{14}$ and $n^{34}$ and thereby to each of the switch contacts $n^{12}$ and $n^{32}$. Externally of the instrument A, the conductor 1 is connected to one terminal of the lamp P'; the conductor 2 is connected to one terminal of the lamp P², and the conductor 3 is connected to one terminal of the lamp P³; the other terminal of each lamp is connected through a branch conductor 6' to an energizing current supply conductor 6, and the cooperating supply conductor 5 is connected to the conductor 4. The motor O³ has a common terminal which is connected to the conductor 6 through the branch conductor 6'. A second terminal of the motor O³ is connected by a branch conductor 3' to the portion of the conductor 3 between the instrument and the lamp P³, and the third terminal of the motor O³ is similarly connected by a branch conductor 1' to the portion of the conductor 1 between the instrument and the lamp P'.

With the described connections, whenever the heater temperature at the bulb $d$ is above normal and the projection F" moves toward the shaft C past the shoulder G³ and the switch N is tilted counterclockwise, as seen in Figs. 4 and 5, current will flow between the supply conductors 5 and 6 through a circuit including the conductors 3 and 4. This will energize the lamp P³, and through the branch conductor 3' will energize the circuit of the motor O³ which is connected between the common motor terminal and the motor terminal connected to the conductor 3', that circuit being in shunt to the lamp P³. The energization of the lamp P³ will indicate that the heater temperature is above normal, and the circuit of the motor O³ then energized will cause the motor to run in the direction to increase the throttling effect of the control valve O².

When the heater temperature at $d$ falls below normal so that the projection F" may engage the shoulder G² and cause the switch N to tilt clockwise, as seen in Fig. 4, from its neutral position, the mercury in the switch connects the switch contacts $n^{31}$ and $n^{32}$, thereby connecting the conductor 1 to the supply conductor 5 through the conductor 4. This causes the lamp P' to glow and also energizes the second circuit of the motor O³. That circuit is then connected at one end to the common terminal of the motor and thereby through the conductor 6' to the supply conductor 6 while the other end of the circuit is connected to the motor terminal connected by the conductor 1' to the conductor 1. The energization of its last mentioned circuit causes the motor O³ to operate in a direction opposite to that previously described, and thereby reduces the throttling effect of the valve O', thereby increasing the heat supply to the heater O.

When the heater temperature at $d$ is normal, so that the switch N occupies its neutral position, the neutral condition of the apparatus will be indicated by the energization of the lamp P² since the conductor 2 will then be connected to the supply conductor 5 by virtue of the fact that the switch contact $n^{21}$ is connected by the mercury within the switch to the switch contacts $n^{12}$ and $n^{32}$ and thereby to the conductor 4, but neither circuit of the motor O³ is then energized. The apparatus of Figs. 1–5 thus gives three position control of the devices P', P² and P³, and two position control of the motor O³.

The general principles of the invention illustrated in Figs. 1–4 may be utilized in control instruments differing widely in form from the instrument shown in those figures. For example, they are utilized in the instrument AA shown in Figs. 7, 8, 9 and 10, and intended for two position control only. The instrument AA includes a mercury control switch NA mounted in a switch carrying frame LA which, when free to do so, turns under the action of gravity into the open, full line position of the switch shown in Figs. 7 and 8. The instrument AA includes provisions for turning the switch into its closed position, shown in dotted lines in Figs. 7 and 8, and for adjusting a latch member S to maintain the switch in its closed position when and as conditions may require the switch to be closed.

The mechanism of the instrument AA for periodically adjusting the positions of the switch frame LA and latch member S, comprises parts B, C, D and E substantially like the corresponding parts of the instrument A. As shown, however, the Bourdon tube D of the instrument A is coaxial with the shaft C and has its free end connected to the shaft C by an arm CD. The instrument AA includes parts BA and EA associated with the parts B and E of the instrument AA, as the parts B' and E' are respectively associated with the parts B and E of the instrument A. In the instrument AA, however, the member EA is formed with an engaging shoulder or edge EA' which coacts with a projection F¹⁰ from a lever FA pivotally connected at B¹⁰ to the arm BA, in a manner analogous to that in which the shoulder G' and projection F' of the lever F of the instrument A coact. The projection F¹⁰ of the lever FA is given its movements radially toward and away from the shaft C by a lever HA which is analogous to the lever H of the instrument A in that it is pivoted to the instrument framework at A⁷, and tends to move in one direction under the action of a spring HA³, and is periodically moved in the opposite direction by the action of a cam IA carried by the constantly rotating cam shaft I³. The oscillation of the lever HA about its pivot A⁷ oscillates the lever FA about its pivot B¹⁰ as a result of the fact that the projection F¹⁰ extends through a slot H¹⁰ in the lever HA, said slot being in the form of a circular arc extending about the shaft C. When the pressure in the Bourdon tube D is above the normal value determined by the adjustment of the index E and associated part EA, the movement of the lever HA under the action of the spring HA³ is terminated by the engagement of the projection $F^{10}$ with the shoulder EA' with the lever HA in the position shown in full lines in Figs. 7 and 8. When the pressure in the tube D is lower than normal, the projection $F^{10}$ is displaced counter-clockwise, as seen in Figs. 7 and 8, from the shoulder EA' and the member HA may then move under the action of the spring $HA^3$ into the position shown in dotted lines in Fig. 8, where its movement is arrested by the engagement of a projection $F^{11}$ carried by the lever FA with the adjacent side edge of the arm BA.

The cam IA acts on the lever HA through a cam roll Q' journalled at the upper end of a supporting arm Q which, as shown, is pivoted on the stud $A^{11}$ forming the pivotal support for the switch frame LA. The cam roll Q' is interposed between the edge of the cam disc IA and an arm $H^{11}$ of the lever HA. As the cam IA rotates clockwise from the position shown in Figs. 7 and 8, the lever HA, after a slight initial movement in the opposite direction, is given a clockwise adjustment which moves the projection $F^{10}$ toward the shaft C to a point within the circle with which the shoulder EA' coincides until the lever HA reaches the dotted line position of Fig. 8. The movement of the lever HA into the latter position is prevented by the shoulder EA when the latter is in position for engagement by the projection $F^{10}$.

The switch frame LA and latch member S are operated by the lever arm Q through a three arm lever R pivotally connected at $Q^2$ to the lever Q and yieldingly held in any position relative to the latter in which it may be turned by a friction spring $Q^3$ carried by the arm Q. One arm of the lever R terminates in a transverse projection R'. A second arm terminates in an upwardly extending hook $R^2$ and is formed at its under side with a hook shoulder $R^3$. The third arm of the lever R has spaced apart lateral projections $R^4$ which straddle the arm Q and limit the movements of the member R relative to the lever Q, between their full line positions, shown in Fig. 8, in which the left hand projection $R^4$ engages the adjacent edge of the arm Q, and their dotted line positions shown in Fig. 8, in which the right hand projection $R^4$ is held against the corresponding edge of the arm Q, by the engagement of an adjacent portion of the member R with the stationary stud $A^{16}$. The roller Q' is given a tendency to bear against cam IA in all positions of the latter by a spring SQ acting between the arm Q and the latch member S, and tending to turn the latter about its supporting pivot $A^{17}$ from its full line position into its dotted line position shown in Fig. 8.

When the pressure in the Bourdon tube D is relatively low, so that the lever HA occupies its full line position in Fig. 8, the clockwise movement of the member Q is arrested by the engagement of the projection R' of the lever R with the shoulder $H^{12}$ of the lever HA and the resultant movement of the left hand projection $R^4$ into engagement with the adjacent edge of the lever Q. This adjusts the hook arm $R^2$ of the lever R into such a position that on the return movement of the arm Q and lever R, effected by the cam IA, the hook $R^2$ will engage a projection S' of the latch member S and move the latter into its full line position unless it is already in that position. This permits the switch frame LA, if previously in its closed position, to turn into its open position. The latch S thus controls the switch movements by virtue of the fact that the arm $L^{10}$ has a transverse end projection $L^{11}$ working in a slot formed in the member S. The slot wall includes a shoulder $S^2$ which in the dotted line position of the latch engages the projection $L^{11}$ and holds the switch in its closed position. When the latch is turned into its full line position, the projection $L^{11}$ may enter the arc shaped portion $S^3$ of the slot and permit the switch to move into open position. The engagement of the projection $L^{11}$ with the bottom wall of the slot portion $S^3$ prevents the latch member S from moving out of its full line position under the action of the spring SQ while the switch is out of its closed position.

When the pressure in the Bourdon tube is relatively low, so that the lever HA moves into its dotted line position, the projection R' passes beneath the shoulder $H^{12}$, the member Q moves into its dotted line position shown in Fig. 8, and the lever member R engages the stud $A^{16}$ which shifts the lever R into its dotted line position relative to member Q. When thereafter the cam returns the parts Q and R, the shoulder $R^3$ engages the projection $L^{11}$ and moves the switch frame LA into its closed position, if not already in that position. As will be apparent from what has already been said, each cam effected movement of the arm Q in the counterclockwise direction can open or close the switch, only in case the switch was previously in its closed or open position, respectively. After a change in the Bourdon tube pressure which brings the projection $F^{10}$ into or out of engagement with the shoulder EA' and a resultant adjustment of the switch has been effected, the switch remains stationary until a reverse change in the Bourdon tube pressure has occurred.

While the instrument AA differs in many respects from the instrument A, the two instruments are alike in novel and practically important respects. In particular, the instruments are alike in that such reaction on the deflecting element of either instrument as occurs when the mechanical relay mechanism actuated by the cam I or IA brings the part F' into contact with the part $G^2$ or $G^3$ of the instrument A, or the part $F^{10}$ into engagement with the part EA' of the instrument AA, is in a direction substantially radial to the axis of instrument deflection. In consequence, the said reaction does not produce in either form of instrument any deflection of the pen arm B, or subject the latter to any bending stress. While such engagement subjects the shaft C to a radial stress, in instruments of the type shown, the shaft C and its bearings may be amply rugged to withstand such reaction without impairment of instrument efficiency or other objectionable results. The fact that the instrument pointer is not subjected to bending stresses is advantageous, and particularly so in a recording instrument where it permits the use of a simple recording pen tracing a continuous record, whereas in an ordinary pinch-the-needle recording instrument it is necessary to employ a recording point intermittently engaging the chart through a transfer ribbon or other transfer material.

Aside from the operative features mentioned, each of the instrument forms disclosed is characterized by a desirable compactness and mechanical simplification resulting from the fact that none of the movable parts of the instrument need have movements transversely of the instrument plane of deflection. This permits the instrument depth, i. e., its dimension in the direction of the length of the shaft C, to be relatively small, with the result that the instrument may be unusually compact, since the dimensions of the instrument transverse to the shaft C large enough to accommodate the usual record chart, are ordinarily quite large enough to accommodate my improved instrument mechanism. While each engagement of the engaging control member parts $F''$, $G^2$ or $G^3$, and $F^{10}$ and $EA'$, temporarily prevents or tends to prevent deflection of the deflecting element of the instrument, the period in which the deflective movement is thus prevent or restricted may be made as short as is practically necessary by the use of a suitable cam contour. In each form of instrument illustrated each such period is followed by a period in which the cam positively interrupts the engagement of the engaging parts, so that the deflecting element is then free to adjust itself in accordance with the value of the condition to which the instrument responds.

The mechanism through which a three position control switch, such as the switch N, may be adjusted into, and suitably maintained in each of its three positions by a control instrument member like or analogous the member J of Figs. 1–4, may have many different forms, some of which are illustrated in Figs. 11–18. The form shown in Figs. 11 and 12 is characterized by the use of a sort of frictional clutch device tending to maintain the switch frame LB in any position into which the latter may be adjusted. As shown, the frictional clutch means comprises opposed frictional washers T which surround the supporting pivot $A^{11}$ for the switch frame, and are interposed between and bear against spaced apart portions of said frame, T' representing a spring acting between the washers T. The latter are formed with squared openings fitting on squared part $T^2$ secured to the pivot $A^{11}$, the latter being anchored in the switch supporting plate $A^{120}$. The latter is formed with slots $A^{15}$ similar to those in the previously described supporting plate $A^{12}$, but the plate $A^{120}$ differs from the plate $A^{12}$ in not having ratchet teeth $A^{14}$. The switch frame LB differs from the frame L in that it carries no pawls such as pawls M' and $M^2$ previously described. The frame LB is provided, however, with projections $L^{20}$ extending through the slots $A^{15}$ in the plate $A^{120}$, and cooperating with the member J to effect switch tilting movements exactly as the pawl projections $M^3$ cooperate with the member J in the instrument first described. In the arrangement of Figs. 11 and 12 the member J may be formed and given movements exactly as in the instrument first described.

The switch mechanism of Figs. 13 and 14 is intended for two position control and is characterized by the use of a snap action spring U having one end connected through a part $A^{121}$ to the supporting plate $A^{120}$ and having its other end connected to a part $L^{21}$ carried by the switch frame LB so that as the switch is turned in either direction between its full and dotted line positions shown in Fig. 13, the line of action of the spring U crosses the axis of the switch pivot $A^{11}$. In consequence the spring tends to complete the switch tilting movement in either direction and tends to maintain the switch in either end position whenever moved into such position. In Fig. 13 the part $J^6$ is omitted as the two position switch needs only two operative positions. Except for the features noted, the switch mechanism of Figs. 13 and 14 does not differ from that shown in Figs. 11 and 12.

The switch mechanism shown in Figs. 15 and 16 differs essentially from that shown in Figs. 11 and 12 only in the character of the provisions made for frictionally tending to maintain the switch frame member in any operative position into which it may be tilted. The switch frame member LC of Figs. 15 and 16 differs from the switch frame member LB essentially only in that it is formed with circular edge portions $L^{22}$ each extending circularly about the axis of the switch pivot $A^{110}$, and in that the openings in the member LC through which the pivot $A^{110}$ passes are enlarged to permit of a little lost motion. Such lost motion permits movement of the surfaces $L^{22}$ into and out of gripping engagement with pins or projections $A^{123}$ carried by the switch supporting plate $A^{120}$. The two projections $A^{123}$ are located at opposite sides of, and a little below the level of the axis of the pivot $A^{110}$, and each is located at a distance from that axis equal to the radius of curvature of the shoulders $L^{22}$. In consequence, when the member J permits, the edges $L^{22}$ wedge between the projections $A^{123}$, and the member LC is thereby held against rotation. When the member J engages and raises either pin $L^{20}$, however, the adjacent edge $L^{22}$ is thereby lifted out of engagement with the adjacent projection $A^{123}$, and the other edge $L^{20}$ is then free to move by gravital action downward along the corresponding projection $A^{123}$. As soon as the lifting action on the operatively engaged pin $L^{20}$ is interrupted, the adjacent edge $L^{22}$ drops by gravital action into engagement with the corresponding pin $A^{123}$, so that the switch frame member LC is again gripped between the two projections $A^{123}$.

The switch mechanism shown in Figs. 17 and 18 makes use of a third form of means for frictionally holding the switch frame member in any position into which it may be adjusted by the member J. The frictional holding means of Figs. 17 and 18 comprises a clutch ball W at each end of the switch frame LD which acts between the adjacent convex edge $L^{23}$ of the frame and a corresponding convex guide surface $A^{124}$ carried by a projection from the supporting plate $A^{120}$. The adjacent surfaces $L^{23}$ and $A^{124}$ are not concentric, but are so shaped that the clutch ball receiving space or ballway between them increases in width from bottom to top, so that each clutch ball W tends to wedge in the space or ballway and prevent up movement of the corresponding end of the frame LD.

Each clutch ball W is lifted to permit up movement of the corresponding end of the switch frame member LD by an actuating bar member X loosely mounted on the switch pivot $A^{11}$ and provided with operating projections X'. The latter extend through the supporting plate slots $A^{15}$ and operatively engage with the member J in a manner similar to the operative engagement of the pins $L^{20}$ and member J of the constructions previously described. At each end the bar X is provided with a projection $X^2$ entering the corresponding ballway and serving, when lifted, to raise the corresponding ball W out of binding engagement with the adjacent surfaces $L^{23}$ and $A^{124}$ and into engagement with a portion $L^{24}$ of the switch member LD whereby the further upward movement of the clutch ball results in a corresponding up movement of the adjacent end of the switch frame LD. Advantageously and as shown, each ball engaging part $L^{24}$ is in the form of a vertical screw in threaded engagement with the member LD so that the rotation of the parts $L^{24}$ permits of a corresponding adjustment in the switch positions. With the arrangements shown in Figs. 17 and 18 there is no need for any special lost motion in the mounting of the switch frame LD on its supporting pivot $A^{11}$.

While in accordance with the provisions of the statutes, I have illustrated and described the best forms of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention what I claim as new and desire to secure by Letters Patent, is:

1. In a control instrument, the combination with two control parts, of means relatively adjusting said parts into different angular positions about an axis in accordance with changes in a control condition, means for effecting relative movements of said parts radially of said axis and thereby effecting engagements of said parts restricting said relative movements or not, according to the relative angular positions of the parts, and means for effecting control actions selectively dependent upon the difference in magnitude of said relative movements resulting from the engagement or non-engagement of said parts.

2. In a control instrument, the combination with two control members each having an engaging part, of means for relatively adjusting said parts into different relative angular positions about an axis in accordance with changes in a control condition, means for effecting relative movements of said parts radially of said axis, thereby effecting or failing to effect engagement of said parts depending on the said relative angular positions of the parts, and means for effecting control actions selectively dependent upon the engagement or non-engagement of said parts.

3. In a control instrument, the combination with a control part, and means for oscillating said part about an axis in accordance with changes in the value of a control condition, of a second control part, means for periodically moving one of said parts relative to the other radially towards and away from said axis along a path resulting in the engagement of said parts and a consequent interruption in their relative movement when the angular position of the first mentioned part corresponds to one value of said condition, but not when said position corresponds to a different value of said condition, and means for effecting control effects selectively dependent on the said interruption or non-interruption of said relative movement.

4. In a control instrument, the combination with a control part and means for adjusting said part about an axis into different positions in accordance with changes in the value of a control condition, of a second control part, means for moving one of said parts relative to the other in a direction alternately toward and away from said axis, the last mentioned means yielding to permit any of said relative movements in one direction to terminate on the engagement of said parts whereby each of said relative movements in said direction is of lesser or greater magnitude accordingly as the adjustment position of the first mentioned part about said axis is or is not such to result in the engagement of said parts on said relative movements, and means for effecting control actions selectively dependent on the magnitude of said relative movements.

5. In a control instrument, an element deflecting about an axis in accordance with changes in a control condition, a normal value element, a member periodically movable toward and away from said axis through a range of movement differing for different relative positions of said elements, and means for periodically creating control effects which are selectively dependent upon the extent of said range of movement.

6. In a control instrument, an element deflecting about an axis in accordance with changes in a control condition, a normally stationary normal value element adjustable about said axis, a member periodically movable toward and away from said axis through a range of movement differing for different relative positions of said elements, and means for periodically creating control effects which are selectively dependent upon the extent of said range of movement.

7. In a control instrument, the combination of two control members having engaging parts, means for adjusting one of said members relatively to the other about an axis, means for moving one of said parts relative to the other in a direction radial to said axis to thereby bring said parts into engagement or not according to the relative angular adjustment about said axis of said members, and means for effecting control actions selectively dependent upon the engagement or non-engagement of said parts.

8. In a control instrument, the combination of two control members, means for angularly adjusting one of said members relative to the other about an axis, one of said members having an engaging portion comprising two parts located at different distances from said axis and displaced from one another angularly with respect to said axis, and the other of said members having a cooperating engaging portion, means for moving one of said portions radially of said axis whereby one or the other of said parts is engaged by said cooperating portion depending on the relative angular adjustment of said members.

9. In a control instrument, the combination of two control members, means for angularly adjusting one of said members relative to the other about an axis, one of said members having an engaging portion comprising two parts located at different distances from said axis and displaced from one another angularly with respect to said axis, and the other of said members having a cooperating engaging portion, and means for moving one of said portions radially of said axis whereby one or the other or neither of said parts is engaged by said cooperating portion depending on the relative angular adjustment of said members.

10. In a control instrument, a control member having an engaging part in the form of an arc extending circularly about an axis, and a second engaging part in the form of a second arc extending circularly about said axis and displaced angularly about and radially of said axis from the first mentioned part, said parts being relatively adjustable angularly about said axis, a second member having an engaging portion, means for adjusting said members relative to one another to move said portion angularly relative to said parts about said axis, means for giving said members relative movements moving said portion relative to said parts in a direction radially of said axis whereby said portion will engage one or the other or neither of said parts depending on the said relative angular adjustment of said members, and control means selectively dependent upon the engagement of said portion with one or the other or neither of said parts.

11. In a control instrument, a member deflecting about an axis in accordance with changes in a control condition, a normally stationary member, a lever having an engaging part and having a pivotal connection at a distance from said part and from said axis with one of said members, the other of said members having an arc shaped shoulder extending circularly about said axis, means for oscillating said lever about its pivotal connection to move said part into engagement with said shoulder and thereby restrict the range of oscillating movement of said lever or to move said part past the end of said shoulder depending on the deflective position of the first mentioned member, and means for effecting control actions selectively dependent on the range of oscillatory movement of said element.

12. In a control instrument, the combination of a member deflecting about an axis in accordance with changes in a control condition, a member manually adjustable about said axis to vary the value of said condition which the instrument tends to maintain, a lever pivoted to turn about an axis at a distance from the first mentioned axis and having a guideway extending circularly about the first mentioned axis, a second lever, one of said members having an engaging portion and said second lever being pivoted to the other of said members and having an operative connection with said guideway whereby oscillation of the first mentioned lever moves said second lever into engagement with or across the adjustment path of said portion depending on the relative position angularly about the first mentioned axis of said members.

13. In a control instrument, the combination with a deflecting element including a member oscillating about an axis in accordance with changes in a control condition, of a second member, one of said members having a shoulder extending circularly about said axis, a lever with a pivotal connection to the other member at a distance from said axis, means for oscillating said lever about its pivotal connection, said lever having a projection movable toward and away from said axis by the oscillating movement of the lever and intercepting or moving past the end of said shoulder according to the deflective position of said element, means for giving said lever its oscillating movements adapted to yield when said engagement occurs, and control means selectively adjusted by said lever in accordance with the magnitude of its movements in the direction which effects such engagement.

14. In a control instrument, a control member having an engaging part in the form of an arc extending circularly about an axis, and a second engaging part in the form of a second arc extending circularly about said axis and displaced angularly about and radially of said axis from the first mentioned part, a second member having an engaging portion, means for adjusting said members relative to one another to move said portion angularly relative to said parts about said axis, means for giving said members relative movements moving said portion relative to said parts in a direction radially of said axis whereby said portion will engage one or the other or neither of said parts depending on the said relative angular adjustment of said members, and control means selectively dependent upon the engagement of said portion with one or the other or neither of said parts.

15. In a control instrument, an element deflecting about an axis in accordance with changes in a control condition, a normal value element independently adjustable about said axis, a separate engaging part associated with each element and normally sharing in the angular movement of the latter about said axis, means for giving one of said parts movements toward and away from said axis whereby it engages the other part or moves alongside the end of the latter according to the relative angular positions of said elements, and a resilient connection between one of said elements and the corresponding engaging part adapted to yield and permit a relative angular adjustment of said elements which the engagement of said radially moving part with the end of the other part tends to prevent.

16. In a control instrument, the combination with a switch pivoted to turn from one position into a second position and having a bias to move into said second position, a retaining member adjustable into and out of a position in which it is adapted to hold said switch in said one position, an oscillating element, an engaging part mounted on said element and adjustable with respect to the latter between one position in which it is adapted to move said retaining member out of its switch holding position and a second position in which it is adapted to move said switch into the said one position of the latter, and an element deflecting about an axis in accordance with changes in a control condition and by its deflective position controlling the position of said engaging part relative to the first mentioned element.

17. In a control instrument, the combination of an element deflecting about an axis in accordance with changes in a control condition, a member adapted to oscillate about an axis parallel to but displaced from the first mentioned axis toward and away from positions selectively dependent on the deflection of said element, a second member adapted to oscillate about a third axis parallel to but displaced from each of the first mentioned axes toward and away from positions selectively dependent upon the said positions of the first mentioned member, means for periodically giving said members their oscillating movements, a control device movable between two positions and having a bias to move from one of said positions into the other position, a retaining element movable into and out of a position in which it is adapted to engage said device and hold the latter in said other position, and an engaging part adjustably mounted on said second member and selectively adjusted relative thereto in accordance with the said positions of the first mentioned member between two positions in one of which it is adapted to engage said device and move the latter into its said one position and in the other of which it is adapted to engage said retaining member and move the latter to permit said device to move into its said other position.

18. In a control instrument, a periodically reciprocating member, means for causing the reciprocating movements of said member to follow one or another of three paths in selective accordance with the different values of a control condition, and a three position switch adjusted into one or another of its three positions by said member accordingly as the movement of the latter is along one or another of said three different paths.

19. In a control instrument, a control device adjustable about an axis and having engaging parts at opposite sides of said axis, an actuating element having reciprocatory device adjusting movements in the general direction of a line intersecting said axis and passing between said parts, and means for adjusting said element transversely of said line in selective accordance with changes in a control condition into one or the other of two different adjustments, in one of which said element is adapted to engage one of said parts and adjust said device into one position, and in the second of which said element is adapted to engage the other of said parts and adjust said device into a second position.

20. In a control instrument, a three position control device adjustable about an axis and having engaging parts at opposite sides of said axis, an actuating element having reciprocatory device adjusting movements in the general direction of a line intersecting said axis and passing between said parts, and means for adjusting said element transversely of said line in selective accordance with change in a control condition into one or another of three different adjustments, in one of which said element is adapted to engage one of said parts and adjust said device into one position, in another of which said element is adapted to engage the other of said parts and adjust said device into a second position, and in a third of which said element is adapted to engage both of said parts and adjust said device into a third position.

21. In a control instrument, a control device adjustable about an axis and having engaging parts at opposite sides of said axis, an actuating element having reciprocatory device adjusting movements in the general direction of a line intersecting said axis and passing between said parts, means for adjusting said element transversely of said line in selective accordance with change in a control condition into one or the other of two different adjustments, in one of which said element is adapted to engage one of said parts and adjust said device into one position, and in the second of which said element is adapted to engage the other of said parts and adjust said device into a second position, and yielding means tending to maintain said device in any of said positions into which it is adjusted.

22. In a control instrument, a support, a control device including a member mounted on said support to turn relatively thereto about an axis and parts at opposite sides of said axis connected to said member with freedom for a limited movement relative thereto, retaining means carried by said support and normally cooperating with said member to prevent turning movement of the latter, an actuating element having reciprocatory movements in the general direction of a line intersecting said axis and passing between said parts, and means for adjusting said element transversely of said line in selective accordance with changes in a control condition into one or the other of two different adjustments, in one of which said member is adapted to engage one of said parts and adjust said member in one direction, and in the second of which said element is adapted to engage the other of said parts and adjust said member in the reverse direction, the initial engagement of said element with each part giving the latter a movement relative to said member rendering said retaining means inoperative to prevent the turning movement of said member in the direction given the latter by the last mentioned part.

23. In a control instrument, a support, a control device including a member mounted on said support to turn relatively thereto about an axis and pawls pivoted to said member at opposite sides of said axis with freedom for a limited movement relative thereto, an actuating element having reciprocatory movements in the general direction of a line intersecting said axis and passing between said pawls, and means for adjusting said element transversely of said line in selective accordance with changes in a control condition into one or the other of two different adjustments, in one of which said member is adapted to engage one of said pawls and adjust said member in one direction, and in the second of which said element is adapted to engage the other of said pawls and adjust said member in the reverse direction, each pawl normally cooperating with said support to prevent movement of the member in the direction given it by said pawl but being rendered inoperative by movement relative to said member given said pawl when engaged by said element.

24. In a control instrument, a control device adapted to turn about an axis and having engaging parts at opposite sides of said axis, a cradle support for said device, said device having a tendency to move transversely of said axis into an engagement with said support preventing turning movement of said device, an actuating element having a reciprocating movement in the general direction of a line extending away from said support and between said parts, and means for adjusting said element transversely of said line in selective accordance with changes in a control condition in which one or the other of two different adjustments in one of which said element is adapted to engage one of said parts and move the latter away from said support whereby said device is turned about said axis in one direction and in the other of which said element is adapted to engage the other of said parts and move it away from said support and thereby turn said device about said axis in the reverse direction.

25. In a control instrument, the combination with a mercury switch comprising a mercury container adjustable into either of three positions, mercury and contacts in said container and external terminals associated with said contacts, and adapted to establish one or another of three control circuits accordingly as said container is in one or another of its three positions, an element deflecting in accordance with changes in a control condition, and means for adjusting said switch container into one or another of its three positions in selective accordance with changes in the deflective position of said element.

26. In a control instrument, a control device adjustable about an axis and having engaging parts at opposite sides of said axis, an actuating element having reciprocatory device adjusting movements in the general direction of a line intersecting said axis and passing between said parts, means for adjusting said element transversely of said line in selective accordance with changes in a control condition into one or the other of two different adjustments, in one of which said element is adapted to engage one of said parts and adjust said device into one position, and in the second of which said element is adapted to engage the other of said parts and adjust said device into a second position, and a spring opposing the initial movement of said device away from, and aiding its final movement toward each of said positions.

27. In a control instrument, a support having opposing portions, a control device mounted on said support to turn relatively thereto about a horizontal axis and having parts at opposite sides of said axis respectively facing said portions, each of said portions and the adjacent part uniting to form a downwardly narrowing ballway, a ball in each ballway normally operative to prevent up movement of the adjacent part, a device turning member having opposed ball parts each adapted to enter one of said ballways and having projections one at each side of said axis, an actuating element have reciprocatory movements in the general direction of a line intersecting said axis and passing between said projections, and means for adjusting said element transversely of said line in selective accordance with changes in a control condition into one or the other of two different adjustments, in one of which said member is adapted to engage one of said projections and adjust said member in one direction, and in the second of which said element is adapted to engage the other of said projections and adjust said member in the reverse direction.

FREDERICK W. SIDE.